US012675330B2

(12) United States Patent
B et al.

(10) Patent No.: US 12,675,330 B2
(45) Date of Patent: Jul. 7, 2026

(54) METHOD AND A SYSTEM FOR EXECUTION OF TASKS IN AN OPERATING ENVIRONMENT

(71) Applicant: Samsung Electronics Co., Ltd., Suwon-si (KR)

(72) Inventors: Sudharshan Rao B, Bengaluru (IN); Tushar Vrind, Bengaluru (IN); Venkata Raju Indukuri, Bengaluru (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 384 days.

(21) Appl. No.: 18/358,501

(22) Filed: Jul. 25, 2023

(65) Prior Publication Data

US 2024/0036930 A1      Feb. 1, 2024

(30) Foreign Application Priority Data

Jul. 29, 2022   (IN) .............................. 202241043652
Jul. 7, 2023   (IN) .............................. 202241043652

(51) Int. Cl.
  *G06F 9/50*        (2006.01)
(52) U.S. Cl.
  CPC .................................. *G06F 9/5038* (2013.01)
(58) Field of Classification Search
  CPC .................................................. G06F 9/48–528
  See application file for complete search history.

(56) References Cited

U.S. PATENT DOCUMENTS

| | | | |
|---|---|---|---|
| 7,448,036 B2 | 11/2008 | Brenner et al. | |
| 7,844,970 B2 | 11/2010 | Theurer | |
| 9,298,504 B1 * | 3/2016 | Vincent | G06F 9/505 |
| 9,870,252 B2 | 1/2018 | Bates | |

(Continued)

FOREIGN PATENT DOCUMENTS

| | | |
|---|---|---|
| CN | 106603215 B | 12/2019 |
| CN | 110673976 A | 1/2020 |
| CN | 112445591 A | 3/2021 |
| EP | 1724684 A1 | 11/2006 |
| KR | 10-1770900 B1 | 8/2017 |

OTHER PUBLICATIONS

Equitable Shortest Job First: A Preemptive Scheduling Algorithm for Soft Real-Time Systems Mario Jean Rene and Dimitri Kagaris (Year: 2014).*

(Continued)

*Primary Examiner* — April Y Blair
*Assistant Examiner* — Paul V Mills
(74) *Attorney, Agent, or Firm* — Harness, Dickey & Pierce, P.L.C.

(57)        ABSTRACT

Various example embodiments relate to methods, devices, and/or systems for executing a plurality of tasks in a computer operating environment. The method comprises monitoring a remaining execution time of a current task executing on the processing circuitry, and performing, by the processing circuitry, pre-emption of the current task based on the remaining execution time of the current task and a desired execution threshold time, the desired execution threshold time being one of a desired value based on one or more configuration parameter of the current task or a dynamic value determined based on information related to ongoing activities in the computer operating environment.

20 Claims, 5 Drawing Sheets

400

MONITOR EXECUTION TIME OF CURRENT TASK COMPLETED IN VIEW OF TOTAL EXECUTION TIME OF CURRENT TASK EXECUTING IN OPERATING ENVIRONMENT — 401

COMPARE EXECUTION TIME OF CURRENT TASK COMPLETED IN VIEW OF TOTAL EXECUTION TIME WITH EXECUTION THRESHOLD TIME, WHERE EXECUTION THRESHOLD TIME IS ONE OF, PRE-DEFINED VALUE AND DYNAMIC VALUE DETERMINED BASED ON INFORMATION RELATED TO ONGOING ACTIVITIES IN OPERATING ENVIRONMENT — 402

PERFORM ALLOWING PRE-EMPTION OF CURRENT TASK OR DEFERRING PRE-EMPTION OF CURRENT TASK, BASED ON COMPARISON — 403

(56)          References Cited

U.S. PATENT DOCUMENTS

| | | | | |
|---|---|---|---|---|
| 9,898,333 | B2 | 2/2018 | Park et al. | |
| 10,002,021 | B2 | 6/2018 | Metz et al. | |
| 10,901,784 | B2 | 1/2021 | Kaveri et al. | |
| 2017/0206118 | A1* | 7/2017 | Therien | G06F 9/5044 |
| 2017/0269964 | A1* | 9/2017 | Ashbaugh | G06F 9/3888 |
| 2019/0087224 | A1* | 3/2019 | Vrind | G06F 9/4818 |
| 2019/0324801 | A1* | 10/2019 | Kaveri | G06F 9/485 |
| 2021/0055969 | A1 | 2/2021 | Jeon et al. | |
| 2023/0325243 | A1* | 10/2023 | Kim-Koon | G06F 9/485 |
| | | | | 718/104 |

OTHER PUBLICATIONS

Implementation and evaluation of global and partitioned scheduling in a real-time OS Giovani Gracioli, Antônio Augusto Fröhlich, Rodolfo Pellizzoni, Sebastian Fischmeister (Year: 2013).*

An Approach Towards Development of a New Cloudlet Allocation Policy with Dynamic Time Quantum Sourav Banerjee, Akash Chowdhury, Swastik Mukherjee, and Utpal Biswas (Year: 2018).*

An Optimized Shortest job first Scheduling Algorithm for CPU Scheduling Muhammad Akhtar, Bushra Hamid, Inayat ur-Rehman, Mamoona Humayun, Maryam Hamayun and Hira Khurshid (Year: 2015).*

IN Office Action for corresponding Indian Patent Application No. 202241043652 issued on May 7, 2025.

Thekkilakattil, Abhilash, "Limited Preemptive Scheduling in Real-Time Systems," Mälardalen University Press Dissertations No. 199, Västerås, Sweden: Mälardalen University, 2016.

Pullai, Anju et al., "Reducing the Number of Context Switches in Real Time Systems," Conference Paper, Jul. 2011, uploaded on Apr. 6, 2021, <https://www.researchgate.net/publication/261320648_Reducing_the_Number_of_Context_Switches_in_Real_Time_Systems>.

* cited by examiner

FIG. 3
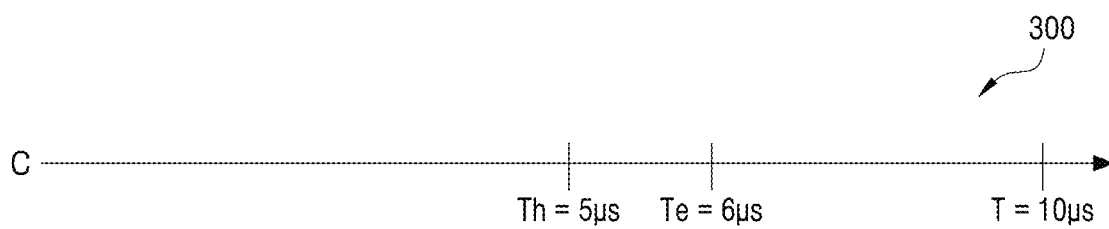
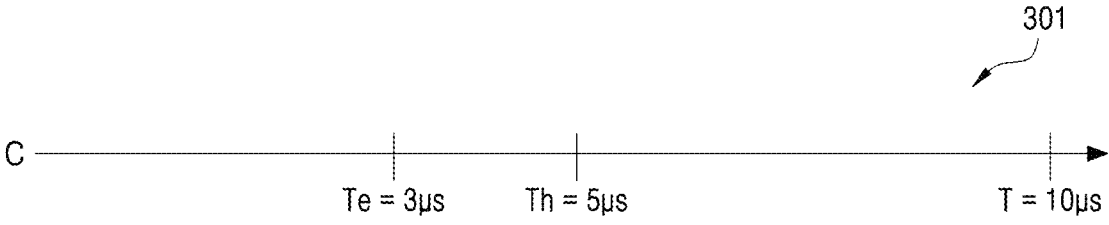

FIG. 4

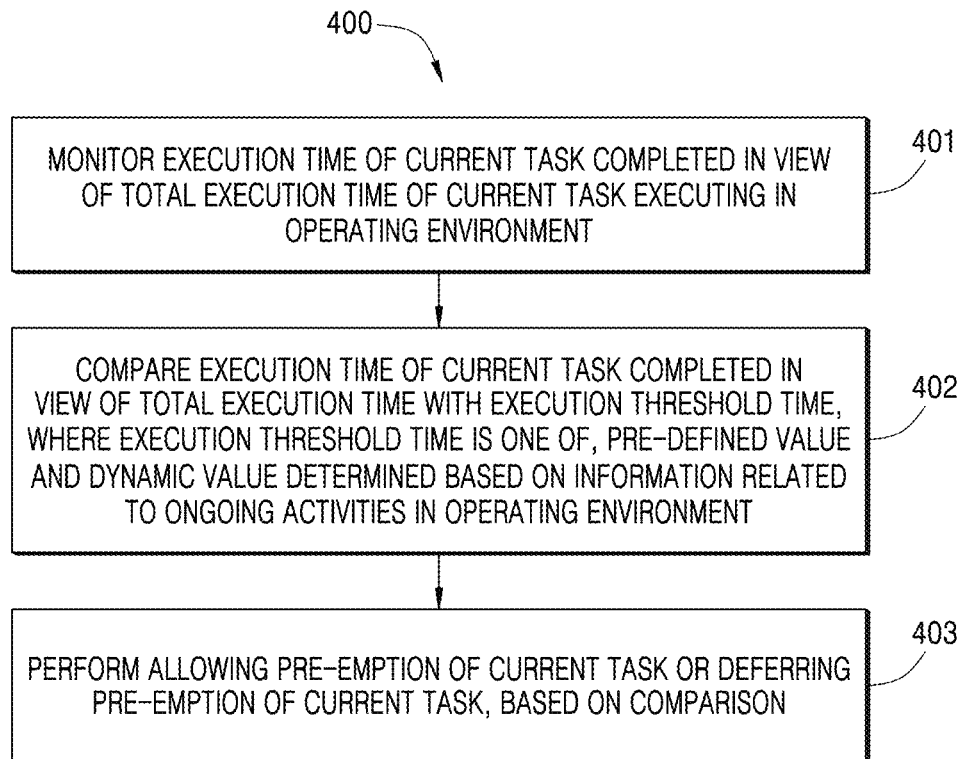

400

MONITOR EXECUTION TIME OF CURRENT TASK COMPLETED IN VIEW OF TOTAL EXECUTION TIME OF CURRENT TASK EXECUTING IN OPERATING ENVIRONMENT ⟋ 401

COMPARE EXECUTION TIME OF CURRENT TASK COMPLETED IN VIEW OF TOTAL EXECUTION TIME WITH EXECUTION THRESHOLD TIME, WHERE EXECUTION THRESHOLD TIME IS ONE OF, PRE-DEFINED VALUE AND DYNAMIC VALUE DETERMINED BASED ON INFORMATION RELATED TO ONGOING ACTIVITIES IN OPERATING ENVIRONMENT ⟋ 402

PERFORM ALLOWING PRE-EMPTION OF CURRENT TASK OR DEFERRING PRE-EMPTION OF CURRENT TASK, BASED ON COMPARISON ⟋ 403

METHOD AND A SYSTEM FOR EXECUTION OF TASKS IN AN OPERATING ENVIRONMENT

CROSS-REFERENCE TO RELATED APPLICATION

This U.S. non-provisional application claims the benefit of priority under 35 U.S.C. § 119 to Indian Provisional Application No. 202241043652, filed on Jul. 29, 2022, and to Indian Non-Provisional Application No. 202241043652, filed on Jul. 7, 2023, the disclosures of each of which are incorporated by reference herein in their entireties.

BACKGROUND

Various example embodiments of the inventive concepts generally relate to computing systems. More particularly, one or more example embodiments of the inventive concepts relate to a method, device, and/or a system for execution of tasks in an operating environment.

In computing systems, an operating system (OS) schedules various tasks for execution by a computing system in order to efficiently handle execution of the tasks. There are various scheduling techniques used to schedule the tasks in the computing systems. The scheduling techniques may include pre-emptive scheduling, non-pre-emptive scheduling, tick less scheduling, and the like. Some of the tasks executing in the computing system may be pre-empted for execution by other tasks in the computing system, or in other words, a second task may be executed prior to a first task even though the first task was scheduled to be executed earlier in time than the second task. The pre-emption may occur due to execution of an OS Application Program Interface (API) command, inter-core task assignment, and the like. For instance, when a higher priority task is ready for execution, a lower priority task may be pre-empted.

However, conventional pre-emption techniques do not consider an execution time of a current task which is executing on the computing system. For instance, the current task may be pre-empted by a higher priority task even when the execution of the lower priority current task is near completion. In the conventional pre-emption techniques, a task, an Interrupt Service Routine (ISR), and/or High-Level Interrupt Service Routine (HISR) may get pre-empted at any time. As a result of the pre-emption, the number of context switches increases in the computing system. The context switch is an expensive process from the OS perspective because the context switch results in multiple resource intensive overhead costs, such as, Memory Management Unit (MMU) table updates, contention extension, bookkeeping overhead costs, and/or cache reload overhead costs, etc., but is not limited thereto.

The information disclosed in this background of the disclosure section is only for enhancement of understanding of the general background of the example embodiments of the inventive concepts and should not be taken as an acknowledgement or any form of suggestion that this information forms the prior art already known to a person skilled in the art.

SUMMARY

At least one example embodiment discloses a method of executing a plurality of tasks in a computer operating environment. The method comprises monitoring, by processing circuitry, a remaining execution time of a current task executing on the processing circuitry, and performing, by the processing circuitry, pre-emption of the current task based on the remaining execution time of the current task and a desired execution threshold time, the desired execution threshold time being one of a desired value based on one or more configuration parameter of the current task or a dynamic value determined based on information related to ongoing activities in the computer operating environment.

At least one example embodiment discloses a system for executing a plurality of tasks in an computer operating environment. The system comprises one or more processors and memory. The one or more processors are configured to monitor a remaining execution time of a current task executing in the computer operating environment, and perform pre-emption of the current task based on the remaining execution time of the current task and a desired execution threshold time, the desired execution threshold time being one of a desired value based on one or more configuration parameter of the current task or a dynamic value determined based on information related to ongoing activities in the computer operating environment.

The foregoing summary is illustrative only and is not intended to be in any way limiting. In addition to the illustrative aspects, example embodiments, and features described above, further aspects and/or features of the example embodiments will become apparent by reference to the drawings and the following detailed description.

BRIEF DESCRIPTION OF THE DRAWINGS

The novel features and characteristics of one or more of the example embodiments of the inventive concepts are set forth in the appended claims. The inventive concepts, further objectives, and advantages thereof, will best be understood by reference to the following detailed description of one or more example embodiments when read in conjunction with the accompanying figures. One or more example embodiments are now described, by way of example only, with reference to the accompanying figures wherein like reference numerals represent like elements and in which:

FIG. 3 shows example illustrations for execution of the tasks in the operating environment, in accordance with some example embodiments of the inventive concepts;

FIG. 4 shows an example flow chart illustrating method operations for execution of the tasks in the operating environment, in accordance with some example embodiments of the inventive concepts.

Figure 1:
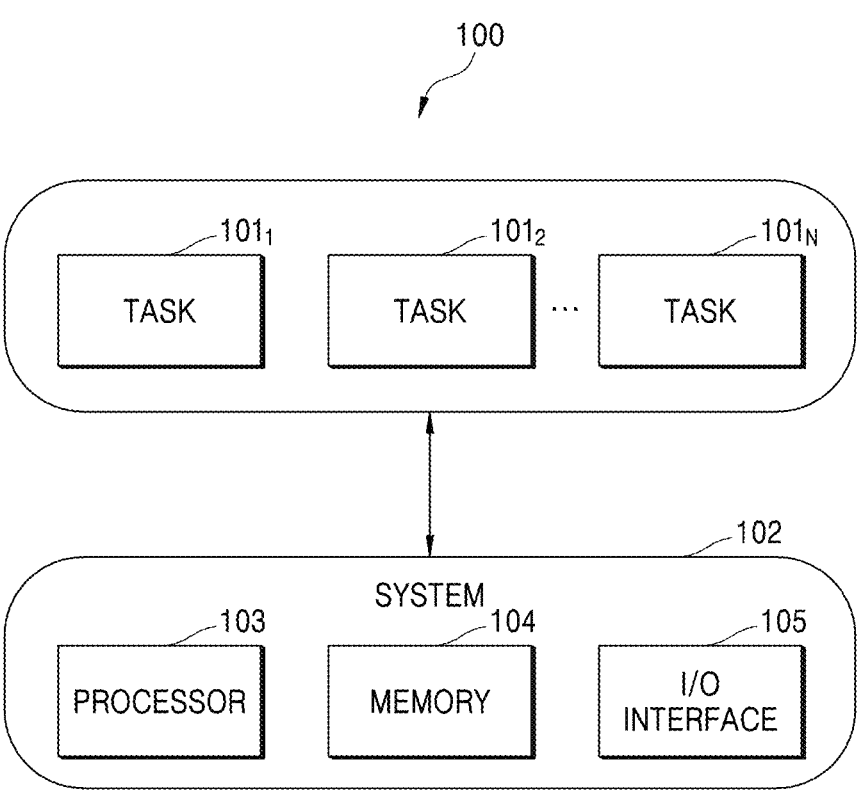
FIG. 1 illustrates an example environment for execution of tasks in an operating environment, in accordance with some example embodiments of the inventive concepts.

It should be appreciated by those skilled in the art that any block diagram herein represents conceptual views of illustrative systems embodying the principles of one or more of the example embodiments of the inventive concepts. Similarly, it will be appreciated that any flow charts, flow diagrams, state transition diagrams, pseudo code, and the like represent various processes which may be substantially represented in non-transitory computer readable medium and executed by a computer and/or processor, whether or not such computer and/or processor is explicitly shown.

DETAILED DESCRIPTION

While various example embodiments of the inventive concepts are capable and/or susceptible to various modifications and alternative forms, specific example embodiments thereof have been shown by way of example in the drawings and will be described in detail below. It should be understood, however that it is not intended to limit the example embodiments of the inventive concepts to the particular forms disclosed, but on the contrary, the example embodiments of the inventive concepts cover all modifications, equivalents, and alternatives falling within the scope of a person of ordinary skill in the art.

The terms "comprises", "comprising", or any other variations thereof, are intended to cover a non-exclusive inclusion, such that a setup, device, system, and/or method that comprises a list of components and/or operations does not include only those components and/or operations, but may include other components and/or operations not expressly listed and/or inherent to such setup, device, system, and/or method, etc. In other words, one or more elements in a method, system and/or apparatus proceeded by "comprises . . . a" does not, without more constraints, preclude the existence of other elements and/or additional elements in the method, system and/or apparatus, etc.

An Operating System (OS) schedules various tasks (e.g., threads, processes, programs, etc.) in a computing system to efficiently handle execution of the tasks. Conventional pre-emption techniques do not consider an execution time of a current task (e.g., a remaining execution time of a current task) which is currently being executed by the computing system. As a result of the pre-emption, the number of context switches between tasks increases in the computing system. A context switch, also known as a process switch or a task switch, refers to the process of the OS of the computing system suspending the execution of the current, pre-empted task, storing the context (e.g., the state) of the current, pre-empted task into memory (including data stored in the processor's registers, the data stored in RAM, etc.), retrieving the context of the higher-priority task from memory and loading the processor's registers and/or RAM with the retrieved context, starting and/or resuming the execution of the higher-priority task, and then performing a second context switch to return to the execution of the pre-empted task once the execution of the higher-priority task has been completed, etc. Consequently, a context switch results in increased overhead costs, such as Memory Management Unit (MMU) table updates, contention extension, bookkeeping overhead, cache reload overhead, and the like. Therefore, there is a desire to improve the resource efficiency and/or speed of computing systems by reducing the number of context switches performed by the OS by determining whether to postpone the execution of the higher priority task based on the remaining execution time of a currently executing lower priority task and a desired threshold value, etc.

Various example embodiments of the inventive concepts provide for a device, method, and/or a system of execution of tasks in an operating environment. One or more of the example embodiments of the inventive concepts monitor an execution time of a current task completed in view of a total expected execution time of the current task (e.g., the completion status of the current task, the remaining execution time of the current task, etc.). Then, the remaining execution time of the current task is compared with a desired execution threshold time. In response to the system determining that the remaining execution time of the current task is less than the desired execution threshold time, pre-emption of the current task is deferred, postponed, and/or ignored, etc. In contrast, if the system determines that the remaining execution time of the current task is greater than or equal to the desired execution threshold time, the pre-emption of the current task is allowed. Thus, one or more of the example embodiments of the inventive concepts reduces the number of times a task is pre-empted. This reduces the number of context switches, thereby reducing the overhead costs associated with each performed context switch, such as Memory Management Unit (MMU) table updates, contention extension, bookkeeping overhead costs, cache reload overhead costs, and the like. In a multicore environment, pre-emptions may be reduced by reducing the number of Inter Core Interrupts (ICI) transmitted. The reduction in the number of pre-emptions to the other core results in a decreased number of context switches performed in those cores, thereby reducing the overhead costs, such as Memory Management Unit (MMU) table updates, contention extension, bookkeeping overhead, cache reload overhead, and the like.

FIG. 1 illustrates an example environment 100 for execution of tasks in an operating environment in accordance with some example embodiments of the inventive concepts. The example environment 100 illustrates an operating environment (e.g., the OS environment of a computing system, etc.). In at least one example embodiment, the operating environment is a single core environment, but the example embodiments are not limited thereto, and for example, the operating environment may be a multi-core environment, a distributed processor environment, a cloud computing environment, etc. The single core computing environment includes a single processor for executing processes (e.g., threads, processes, programs, tasks, etc.) in the operating environment. The multicore environment includes multiple processors (and/or processing cores, etc.) for executing multiple processes, threads, tasks, programs, etc., at the same time (e.g., in parallel) and/or sequentially, etc. The operating environment may comprise a system 102 for execution of a plurality of tasks $101_1$, $101_2$, . . . , $101_N$ (collectively referred to as the tasks 101 or a current task 101) in the operating environment. The system 102 may comprise at least one processor 103, a memory 104, and/or an Input/Output (I/O) interface 105, etc., but the example embodiments are not limited thereto, and for example, the system 102 may include a greater or lesser number of constituent components. The operating environment may include other components, such as an operating system (not illustrated in the Figures), etc., and this should not be considered as limiting. The multicore environment may include multiple processors, one or more processors 103, one or more multi-core processors, etc., and the FIG. 1 illustrating a single processor 103 should not be considered as limiting. The tasks $101_1$, $101_2$, . . . , $101_N$ may include at least one task associated with at least one application associated with at least one user, at least one system task (e.g., operating system task, kernel task, etc.), and the like.

The system 102 may be configured for execution of the tasks 101 in the operating environment. A current task 101 may be executing in the operating environment, but the example embodiments are not limited thereto. Firstly, the system 102 may monitor an execution time of a current task 101 completed in view of a total expected execution time of the current task 101, or in other words, the remaining execution time of the current task 101, a completion status of the current task 101, a completion ratio of the current task 101, etc. Then, the system 102 may compare the remaining execution time of the current task 101 with a desired execution threshold time. In at least one example embodiment, the desired execution threshold time may include a desired and/or pre-defined value based on one or more configuration parameters of the current task 101, but is not limited thereto. In at least one example embodiment, the desired execution threshold time may include a dynamic value determined based on information related to ongoing activities in the operating environment, e.g., a number of other tasks currently enqueue, a resource utilization rate of the operating environment, a priority level of the current task 101, etc., but the example embodiments are not limited thereto. The system 102 may determine whether the execution time of the current task 101 is near completion based on the results of the comparison, or in other words, the system 102 may determine whether the current task 101 may be pre-empted based on the remaining execution time of the current task 101 and the desired execution threshold time. The system 102 may allow, enable, and/or execute the pre-emption of the current task 101 or defer, postpone, and/or ignore the pre-emption based on the results of the comparison. The system 102 for execution of the tasks 101 may include, but is not limited to, a laptop computer, a desktop computer, a Personal Computer (PC), a server, a network server, a cloud-based server, a smartphone, a tablet, any other smart device, and the like. As used herein, processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

Figure 2:
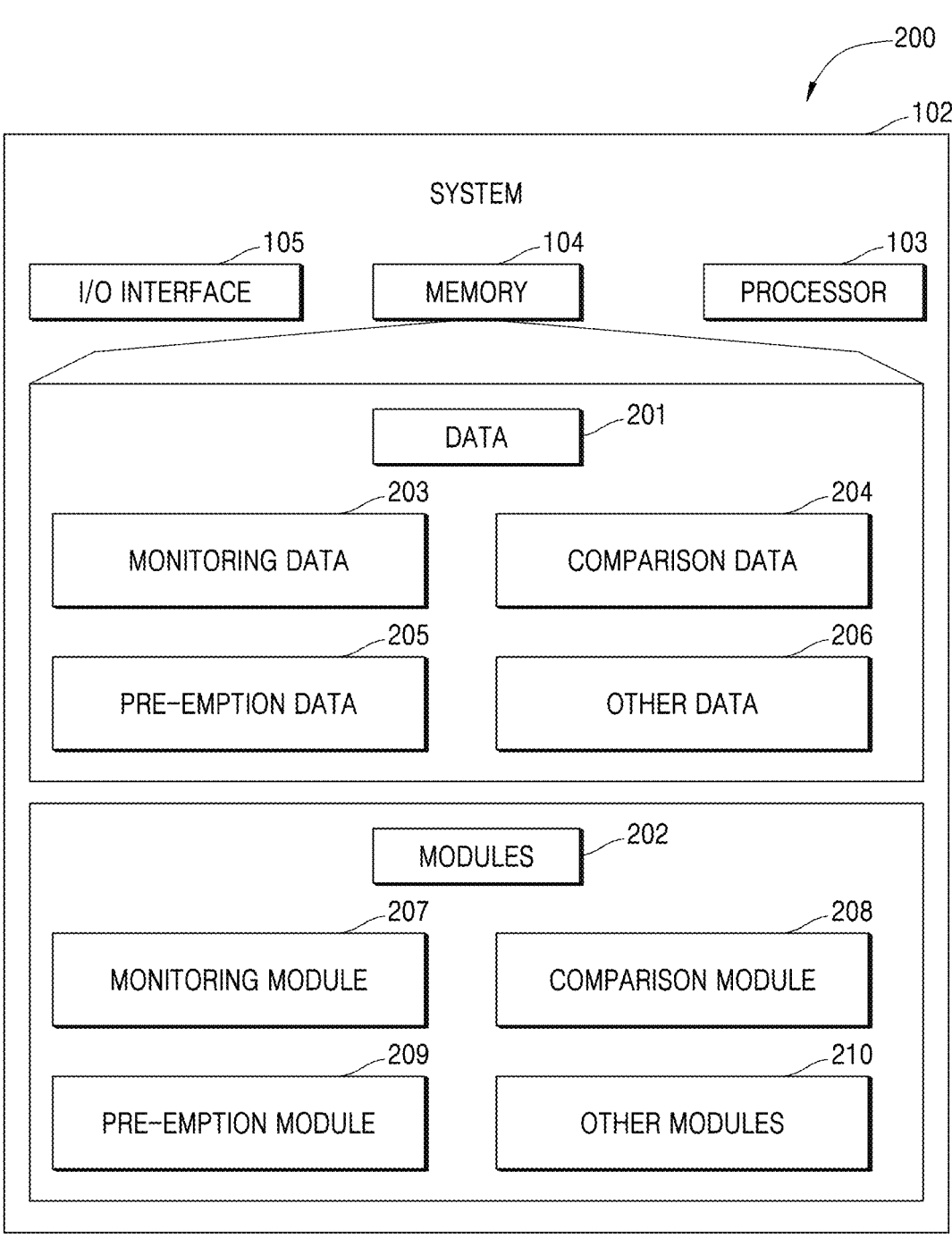
FIG. 2 illustrates a detailed diagram of a system for execution of the tasks in the operating environment, in accordance with some example embodiments of the inventive concepts.

FIG. 2 illustrates a detailed diagram 200 of the system 102 for execution of the tasks 101 in the operating environment in accordance with some example embodiments of the inventive concepts. The system 102 may include one or more Central Processing Units 103 (also referred as "CPUs," "processors," and/or "the controller", etc.), Input/Output (I/O) interface 105, and a memory 104. In some example embodiments, the memory 104 may be communicatively coupled to the system 102. The system 102 may comprise at least one data processor for executing program components for executing user and/or system-generated requests. The memory 104 may be communicatively coupled to the system 102. The memory 104 stores computer readable instructions executable by the system 102, which, on execution, may cause the system 102 to execute the tasks 101 in the operating environment, but the example embodiments are not limited thereto. In at least one example embodiment, the memory 104 may include one or more modules 202 and data 201. The one or more modules 202 may be configured to perform the operations of the inventive concepts using the data 201, to execute the tasks 101 in the operating environment. In at least one example embodiment, one or more of the modules 202 may be a hardware circuit, e.g., a form of processing circuitry, which may be outside and/or external to the memory 104 and coupled with the system 102. For example, the term modules 202 may refer to an Application Specific Integrated Circuit (ASIC), an electronic circuit, a Field-Programmable Gate Arrays (FPGA), Programmable System-on-Chip (PSoC), a combinational logic circuit, and/or other suitable components which provide the described functionality. The one or more modules 202 when configured with the described functionality defined in one or more of the example embodiments of the inventive concepts will result in a novel hardware. Further, the I/O interface 105 is coupled with the system 102 through which an input signal or/and an output signal is communicated.

In at least one implementation, the modules 202 may include, for example, a monitoring module 207, a comparison module 208, a pre-emption module 209, and/or other modules 210, but are not limited thereto. It will be appreciated that such aforementioned modules 202 may be represented as a single module and/or a combination of different modules. In at least one implementation, the data 201 may include, for example, monitoring data 203, comparison data 204, pre-emption data 205, and/or other data 206, etc.

In at least one example embodiment, the monitoring module 207 may be configured to monitor an execution time of the current task 101 completed in view of a total expected execution time of the current task 101. The current task 101 may be at least one task associated with at least one application associated with at least one user, at least one system task, and the like, executing in the operating environment. In at least one example embodiment, the monitoring module 207 may monitor the current task 101 based on a request, instruction, and/or requirement of pre-emption of the current task 101. In at least one example embodiment, the current task 101 may be $C_1$. A task $C_2$ may be another task in the operating environment. The priority of the task $C_2$ may be higher than a priority of the current task $C_1$. The task $C_2$ may be ready for execution and waiting in a ready queue (e.g., task queue, etc.). The processor and/or OS of the operating environment may issue a request, instruction, and/or a requirement for pre-emption of the current task 101 due to the task $C_2$ being ready for execution and having a higher priority than the current task $C_1$. In such a case, the monitoring module 207 may monitor the execution time of the current task 101 completed in view of the total expected execution time of the current task 101, or in other words, the remaining execution time of the current task 101, etc. Referring to an example 300 illustrated in FIG. 3, the total expected execution time (T) of the current task 'C' may be 10 μs. The execution time ($T_e$) of the current task 101 completed in view of the total expected execution time of the current task 101 (e.g., remaining execution time of the current task 101, etc.) may be 6 μs. Referring to another example 301 illustrated in FIG. 3, the total expected execution time (T) of the current task 'C' may be 10 μs. The execution time ($T_e$) of the current task 101 completed in view of the total expected execution time of the current task 101 (e.g., remaining execution time of the current task 101, etc.) may be 3 μs. The execution time of the current task 101 completed in view of the total expected execution time of the current task 101 (e.g., remaining execution time of the current task 101, etc.) and the total expected execution time may be stored as the monitoring data 203 in the memory 104, but is not limited thereto.

In at least one example embodiment, the comparison module 208 may be configured to receive the monitoring data 203 from the monitoring module 207. Further, the comparison module 208 may compare the execution time of the current task 101 completed in view of the total expected execution time (e.g., remaining execution time of the current task 101, etc.) with an execution threshold time. In at least one example embodiment, the execution threshold time is a desired and/or pre-defined value based on one or more configuration parameters of the current task 101 (e.g., user-defined settings, OS-defined settings, etc.). Additionally, the total expected execution time may be determined based on the one or more configuration parameters of the current task 101. For instance, the configuration parameter of the current task 101 may indicate that the current task 101 is a fixed duration task (e.g., a fixed duration activity, etc.), such as Physical layer Interrupt Service Routines (PHY ISRs), etc., which has a desired and/or predetermined fixed duration, etc. In such a case, the total expected execution time of the task may be determined based on an associated fixed duration activity value (e.g., the desired and/or pre-defined value) corresponding to the configuration parameter of the current task 101. Then, the execution threshold time may be determined from the total expected execution time. In at least one example embodiment, the configuration parameter may include an execution threshold time which may be a desired and/or predefined value in terms of unit of time, say, microseconds, but is not limited thereto. For example, the execution threshold time may be set and/or determined as, e.g., 7 μs when the total expected execution time is, e.g., 10 μs, but the example embodiments are not limited thereto. In at least one example embodiment, the configuration parameter may include an execution threshold time may be determined in terms of a desired percentage. For example, the configuration parameter may indicate that the execution threshold time may be, e.g., 70% of the total expected execution time of the current task 101, etc. A person of ordinary skill in the art will appreciate that the execution threshold time may be determined and/or expressed in units other than the above-mentioned units.

In at least one example embodiment, the execution threshold time is a dynamic value determined based on information related to ongoing activities in the operating environment, etc. Additionally, the total expected execution time may also be determined based on the information related to the ongoing activities in the operating environment, etc. The information related to the ongoing activities in the operating environment may comprise at least one of, one or more current activities in one or more cores (e.g., processor cores, etc.), a load observed on the one or more cores, a frequency of execution of tasks in the one or more cores, and the like. The ongoing activities in the operating environment may affect the execution of the current task 101, but are not limited thereto. The information related to the ongoing activities may be considered to determine the total expected execution time. Then, the desired execution threshold time may be determined based on the total expected execution time. In at least one example embodiment, the execution threshold time may be determined based on an explicit Application Programming Interface (API) command, but the example embodiments are not limited thereto.

The comparison module 208 may compare the execution time of the current task 101 completed in view of the total expected execution time (e.g., remaining execution time of the current task 101, etc.) with the desired execution threshold time. Referring to the example 300 illustrated in FIG. 3, the desired execution threshold time (Th) may be 5 μs. The execution time $(T_e)$ completed in view of the total expected execution time (T) (e.g., remaining execution time of the current task 101, etc.) may be 6 μs. According to at least one other example embodiment, the comparison module 208 may compare the remaining execution time (e.g., the amount of time remaining before the current task completes execution) $(T_e)$ with the desired execution threshold time (Th) and determines that the remaining execution time $(T_e)$ is greater than or equal to the desired execution threshold time (Th), but the example embodiments are not limited thereto. For example, referring to the example 301 illustrated in FIG. 3, the desired execution threshold time (Th) may be 5 μs. The remaining execution time $(T_e)$ completed in view of the total expected execution time (T) (e.g., remaining execution time of the current task 101, etc.) may be 3 μs. The comparison module 208 compare the remaining execution time $(T_e)$ with the desired execution threshold time (Th) and determine that the execution time $(T_e)$ is less than the execution threshold time (Th). The comparison module 208 may store results of the comparison as the comparison data 204 in the memory 104.

In at least one example embodiment, the pre-emption module 209 may receive the comparison data 204 from the comparison module 208. Further, the pre-emption module 209 may perform one of, allowing pre-emption of the current task 101 or deferring, postponing, and/or ignoring the pre-emption of the current task 101 based on the results of the comparison. The criteria for deferring the pre-emption of the current task is shown in equation (1) below:

$$T_e < Th \tag{1}$$

The pre-emption module 209 may defer, postpone, and/or ignore the pre-emption of the current task 101 in response to the remaining execution time being less than the desired execution threshold time. Referring to the example 300 illustrated in FIG. 3, the remaining execution time $(T_e)$ is greater than or equal to the desired execution threshold time (Th). Hence, the pre-emption module 209 may perform the pre-emption of the current task 101. The pre-emption module 209 may allow the pre-emption of the current task 101 when the remaining execution time of the current task 101 is less than the desired execution threshold time. Referring to the example 301 illustrated in FIG. 3, the remaining execution time $(T_e)$ is less than the desired execution threshold time (Th). Accordingly, the pre-emption module 209 may defer, postpone, and/or ignore the pre-emption instruction. Thus, one or more of the example embodiments of the inventive concepts ensure that the current task 101 is not pre-empted when the execution of a task is near completion, thus reducing the number of context switches and reducing the numerous overhead costs associated with each of the context switches.

In at least one example embodiment, the configuration parameters of the current task 101 may indicate that the current task 101 is a bounded task in the multicore environment, or in other words, the current task 101 may be assigned to a particular processor and/or processor core and cannot be executed on a different processor and/or processor core, etc. In the multicore environment, a bounded core executing the current task 101 is identified, assigned, etc., via, for example, the configuration value associated with the current task 101. Hence, the bounded core for executing the current task 101 is selected based on one or more conditions associated with the bounded core. The one or more conditions may comprise at least one of, identifying whether the bounded core is not a local core, whether the bounded core is active, whether the bounded core running a lower priority task, whether the bounded core is not executing a real-time task, and the like. For example, a real-time task cannot be pre-empted. Hence, the condition for selecting the bounded core includes that the bounded core is not executing a real-time task, but the example embodiments are not limited thereto. Upon selecting the bounded core running the current task 101, the execution time of the current task 101 is compared with an execution value (e.g., remaining execution time of the current task 101 is compared to the desired execution threshold value, etc.). In the multicore environment, an additional time is involved in transmitting an interrupt to the bounded core in the process of pre-emption. Thus, the execution value is determined based on the desired execution threshold time and a time desired and/or required to process the interrupt (e.g., an interrupt processing time, etc.) to the bounded core is s provided in equation (2) below:

$$T_e < Th + T_i \qquad (2)$$

where, '$T_1$' represents the time desired and/or required to process the interrupt to the bounded core (e.g., an interrupt processing time associated with the bounded core, etc.).

The pre-emption module 209 performs one of, allowing pre-emption of the current task 101 when the remaining execution time is greater than or equal to the desired execution value and deferring the pre-emption of the current task 101 when the execution time is less than the execution value.

In at least one additional example embodiment, the configuration parameters of the current task 101 may indicate the current task 101 is a free-running task, e.g., a task which is continually repeated once it has completed its execution, in the multicore environment. In the multicore environment, a target core executing the current task 101 may need to be identified and/or assigned from a plurality of target cores. Hence, a target core to execute the current task 101 is selected based on one or more conditions associated with the target core. The one or more conditions may comprise at least one of, identifying whether the target core is not a local core, the target core is active, the target core is running a lower priority task, the target core is not executing a real-time task, and/or the target core is associated with an idle time greater than idle times of other cores from the plurality of target cores, etc., but is not limited thereto. Upon selecting the target core to run the current task 101, the execution time of the current task 101 (e.g., remaining execution time of the current task 101, etc.) is compared with the execution value. Further, the pre-emption module 209 performs one of, allowing pre-emption of the current task 101 when the remaining execution time is greater than or equal to the execution value and deferring, postponing, and/or cancelling the pre-emption of the current task 101 when the remaining execution time is less than the execution value, etc. In at least one example embodiment, the system 102 may communicate with an operating system (not illustrated in Figures) to perform the pre-emption of the current task 101, when the pre-emption is allowed. Further, the system 102 may provide indication to the operating system to not perform (e.g., cancel, postpone, defer, etc.) the pre-emption of the current task 101, when the pre-emption is deferred. Data related to the pre-emption of the current task 101 may be stored as the pre-emption data 205 in the memory 104.

The other data 206 may store data including temporary data and temporary files, generated by the one or more modules 202 for performing the various functions of the system 102. The one or more modules 202 may also include the other modules 210 to perform various miscellaneous functionalities of the system 102. The other data 206 may be stored in the memory 104. It will be appreciated that the one or more modules 202 may be represented as a single module and/or a combination of different modules, etc., but the example embodiments are not limited thereto.

FIG. 4 shows an example flow chart illustrating method operations for execution of the tasks 101 in the operating environment, in accordance with some example embodiments of the inventive concepts. As illustrated in FIG. 4, the method 400 may comprise one or more operations. The method 400 may be described in the general context of computer executable instructions. Generally, computer executable instructions can include routines, programs, objects, components, data structures, procedures, modules, and/or functions, etc., which perform particular functions and/or implement particular abstract data types, but the example embodiments are not limited thereto.

The order in which the operations of method 400 is described is not intended to be construed as a limitation, and any number of the described method operations and/or blocks may be combined in any order to implement the method. Additionally, individual operations and/or blocks may be deleted from the method without departing from the scope of one or more of the example embodiments described herein. Furthermore, the method may be implemented in any suitable hardware and/or combination of hardware and software or combination of hardware and firmware, etc.

At operation 401, the system 102 monitors the execution time of the current task 101 which has been completed in view of the total expected execution time of the current task 101 (e.g., the completion status and/or remaining execution time of the current task, etc.). The current task 101 may be a task associated with an application associated with a user, a system task, and the like, executing in the operating environment. In at least one example embodiment, the system 102 may monitor the current task 101 based on a desire to, an instruction to, and/or a requirement of pre-emption of the current task 101, etc.

At operation 402, the system 102 may compare the remaining execution time of the current task 101 with the desired execution threshold time. The execution threshold time may be a desired and/or pre-defined value based on one or more configuration parameters of the current task 101 and/or a dynamic value determined based on information related to ongoing activities in the operating environment, etc.

At operation 403, the system 102 may perform one of, allowing and/or enabling pre-emption of the current task 101, or deferring, postponing, and/or disabling the pre-emption of the current task 101 based on the results of the comparison. The pre-emption module 209 may defer, postpone, ignore, and/or disable the pre-emption of the current task 101 in response to the remaining execution time being less than the desired execution threshold time, but the example embodiments are not limited thereto. Further, the pre-emption module 209 may allow the pre-emption of the current task 101 in response to the execution time of the current task 101 being greater than or equal to the desired execution threshold time, but the example embodiments are not limited thereto.

Figure 5:
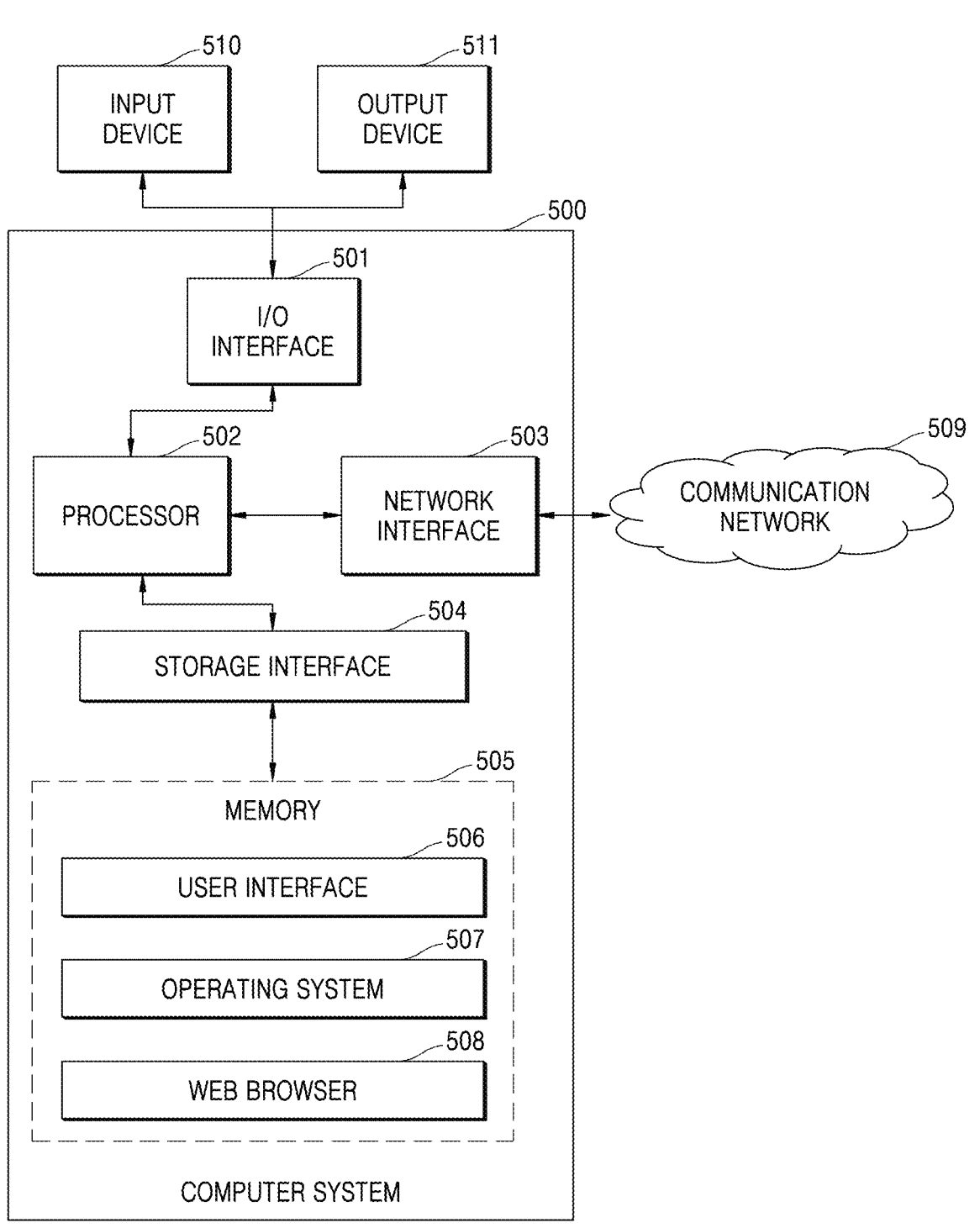
FIG. 5 shows a block diagram of a general-purpose computing system for execution of the tasks in the operating environment, in accordance with example embodiments of the inventive concepts.

FIG. 5 illustrates a block diagram of an example computer system 500 for implementing one or more example embodiments of the inventive concepts. In at least one example embodiment, the computer system 500 may include the system 102, but is not limited thereto. Thus, the computer system 500 may be used to execute the tasks 101 in the operating environment. The interface may include an internal interface and/or an external interface. The computer system 500 may comprise at least one Central Processing Unit 502 (also referred as "CPU," "processor," "multi-core processor," etc.). The processor 502 may comprise at least one data processor. The processor 502 may include specialized processing units, such as integrated system (bus) controllers, memory management control units, floating point units, graphics processing units, digital signal processing units, etc. According to some example embodiments, one or more of the integrated system bus controllers, memory management control units, floating point units, graphics processing units, digital signal processing units, etc., may be implemented as processing circuitry, and may include hardware including logic circuits; a hardware/software combination such as a processor executing software and/or firmware; or a combination thereof. For example, the processing circuitry more specifically may further include, but is not limited to, an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The processor 502 may be in communication with one or more input/output (I/O) devices (not shown) via I/O interface 501. The I/O interface 501 may employ communication protocols/methods such as, without limitation, audio, analog, digital, monoaural, RCA, stereo, IEEE (Institute of Electrical and Electronics Engineers)-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device 510 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 511 may be a printer, fax machine, video display (e.g., cathode ray tube (CRT), liquid crystal display (LCD), light-emitting diode (LED), plasma, Plasma display panel (PDP), Organic light-emitting diode display (OLED), or the like), audio speaker, etc.

The processor 502 may be in communication with the communication network 509 via at least one network interface 503, etc. The network interface 503 may communicate with the communication network 509. The network interface 503 may employ connection protocols including, without limitation, direct connect, Ethernet (e.g., twisted pair 10/100/1000 Base T, etc.), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), an intranet, a private network, the Internet, etc., and/or any combinations thereof. The network interface 503 may employ connection protocols include, but not limited to, direct connect, Ethernet (e.g., twisted pair 10/100/1000 Base T, etc.), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, a local area network (LAN), a wide area network (WAN), a wireless network (e.g., using Wireless Application Protocol), an intranet, a private network, the Internet, and/or Wi-Fi, etc., or any combinations thereof. The first network and/or the second network may be a dedicated network and/or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and/or the second network may include a variety of network devices, including routers, bridges, servers, computing devices, storage devices, etc.

In some example embodiments, the processor 502 may be in communication with a memory 505 (e.g., RAM, ROM, etc. not shown in FIG. 5) via at least one storage interface 504, etc. The storage interface 504 may connect to memory 505 including, without limitation, memory drives, removable disc drives, etc., employing connection protocols, such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program and/or database components, including, without limitation, user interface 506, an operating system 507, web browser 508 etc. In some example embodiments, computer system 500 may store user/application data, such as, the data, variables, records, etc., as described in connection with one or more example embodiments. Such databases may be implemented as fault-tolerant, relational, scalable, secure databases such as Oracle® or Sybase®, etc.

The operating system 507 may facilitate resource management and operation of the computer system 500. Examples of operating systems include, without limitation, APPLE MACINTOSH® OS X, UNIX®, UNIX-like system distributions (e.g., BERKELEY SOFTWARE DISTRIBUTION™ (BSD), FREEBSD™, NETBSD™, OPENBSD™, etc.), LINUX DISTRIBUTIONS™ (e.g., RED HAT™, UBUNTU™, KUBUNTU™, etc.), IBM™ OS/2, MICROSOFT™ WINDOWS™ (XP™ VISTA™/7/8, 10 etc.), APPLE® IOS™ GOOGLE® ANDROID™, BLACKBERRY® OS, and/or the like.

In some example embodiments, the computer system 500 may implement the web browser 508 stored program component. The web browser 508 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX™, DHTML™, ADOBE® FLASH™, JAVASCRIPT™, JAVA™, Application Programming Interfaces (APIs), etc. In some example embodiments, the computer system 500 may implement a mail server (not shown in Figure) stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™, JAVASCRIPT™, PERL™, PHP™, PYTHON™, WEB OBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), and/or the like. In some example embodiments, the computer system 500 may implement a mail client stored program component. The mail client (not shown in Figure) may be a mail viewing application, such as APPLE® MAIL™, MICROSOFT® ENTOURAGE™, MICROSOFT® OUTLOOK™, MOZILLA® THUNDERBIRD™, etc.

Furthermore, one or more non-transitory computer-readable storage media may be utilized in implementing one or more example embodiments consistent with the inventive concepts. A non-transitory computer-readable storage medium refers to any type of physical memory on which information and/or data readable by at least one processor may be stored. Thus, a non-transitory computer-readable storage medium may store computer readable instructions for execution by one or more processors, including computer readable instructions for causing the processor(s) to perform operations and/or stages consistent with one or more example embodiments described herein. The term "computer-readable medium" should be understood to include tangible items and exclude carrier waves and transient signals, e.g., be non-transitory. Examples include Random Access Memory (RAM), Read-Only Memory (ROM), volatile memory, non-volatile memory, hard drives, Compact Disc Read-Only Memory (CD ROMs), Digital Video Disc (DVDs), flash drives, disks, and any other known physical storage media.

Various example embodiments of the inventive concepts monitor an execution time of a current task completed in view of a total expected execution time for allowing or deferring pre-emption. Thus, at least one example embodiment of the inventive concepts reduces the number of times a task is pre-empted. This reduces the number of context switches performed, thereby reducing multiple overheads costs, such as Memory Management Unit (MMU) table updates, contention extension, bookkeeping overhead, cache reload overhead, and the like. Further, the number of Inter Core Interrupts (ICI) transmitted for the pre-emption is reduced in case of a multicore environment, etc.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of at least one example embodiment with several components in communication with each other does not imply that all such components are desired and/or required. On the contrary a variety of optional components are described to illustrate the wide variety of possible example embodiments of the inventive concepts.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices and/or programs. The functionality and/or the features of a device may be additionally embodied by one or more other devices which are not explicitly described as having such functionality and/or features. Thus, other example embodiments of the inventive concepts need not include the device itself.

The illustrated operations of FIG. 4 shows certain operations and/or events occurring in a certain order. In other example embodiments, certain operations may be performed in a different order, modified, and/or removed. Moreover, operations may be added to the above-described logic and still conform to the described example embodiments. Further, operations described herein may occur sequentially and/or certain operations may be performed in parallel. Yet further, operations may be performed by a single processing unit, multiple processing units, and/or by distributed processing units.

Finally, the language used in the specification has been principally selected for readability and instructional purposes, and it may not have been selected to delineate or circumscribe the inventive concepts. It is therefore intended that the scope of the inventive concepts be limited not by this detailed description, but rather by any claims that issue on an application based here on. Accordingly, the disclosure of some example embodiments of the inventive concepts is intended to be illustrative, but not limiting, of the scope of the inventive concepts, which is set forth in the following claims.

While various aspects and example embodiments have been disclosed herein, other aspects and example embodiments will be apparent to those skilled in the art. The various aspects and example embodiments disclosed herein are for purposes of illustration and are not intended to be limiting, with the true scope being indicated by the following claims.

We claim:

1. A method of executing a plurality of tasks in a computer operating environment, the method comprising:
    monitoring, by processing circuitry, a remaining execution time of a current task executing on a first processor core; and
    performing, by the processing circuitry, pre-emption of the current task based on the remaining execution time of the current task and a desired execution threshold time, the desired execution threshold time being one of a desired value based on one or more configuration parameters of the current task or a dynamic value determined based on information related to ongoing activities in the computer operating environment, wherein the performing the pre-emption further includes,
    comparing the remaining execution time of the current task executing on the first processor core with a desired execution value, the desired execution value determined based on the desired execution threshold time and an interrupt processing time associated with the first processor core,
    pre-empting the current task in response to the remaining execution time being greater than or equal to the desired execution value, and
    cancelling the pre-emption of the current task in response to the remaining execution time being less than the desired execution value.

2. The method as claimed in claim 1, wherein the computer operating environment is one of:
    a single processor core environment or a multi-processor core environment.

3. The method of claim 1, the method further comprising:
    determining the desired execution threshold time based on a total expected execution time of the current task, the total expected execution time being determined based on the one or more configuration parameters of the current task and the information related to the ongoing activities in the computer operating environment.

4. The method as claimed in claim 1, wherein the information related to the ongoing activities in the computer operating environment comprises at least one of:
    one or more current activities in one or more processor cores, a load observed on the one or more processor cores, a frequency of execution of tasks in the one or more processor cores, or any combinations thereof.

5. The method as claimed in claim 1, wherein the current task is one of:
   a bounded task or a free-running task in a multi-processor core environment.

6. The method as claimed in claim 5, wherein in response to the current task being the bounded task:
   the method further comprises,
      selecting a bounded processor core as the first processor core for executing the current task based on one or more bounded core conditions associated with the bounded processor core; and
   the performing the pre-emption further comprises,
      comparing the remaining execution time of the current task executing on the bounded processor core with the desired execution value, the desired execution value determined based on the desired execution threshold time and the interrupt processing time associated with the bounded processor core.

7. The method as claimed in claim 6, wherein the one or more bounded core conditions comprises at least one of:
   identifying that the bounded processor core is not a local processor core, determining that the bounded processor core is active, determining that the bounded processor core is running a lower priority task, determining that the bounded processor core is not executing a real-time task, or any combinations thereof.

8. The method as claimed in claim 5, wherein in response to the current task being the free-running task;
   the method further comprises,
      selecting a target processor core to execute the current task from a plurality of target processor cores based on one or more target core conditions associated with the plurality of target processor cores; and
      the performing the pre-emption comprises,
      comparing the remaining execution time of the current task executing on the target processor core with the desired execution value, the desired execution value set based on the desired execution threshold time of the current task and the interrupt processing time associated with the target processor core.

9. The method as claimed in claim 8, wherein the one or more target core conditions comprises at least one of:
   identifying that the target processor core is not a local processor core, determining that the target processor core is active, determining that the target processor core is running a lower priority task, determining that the target processor core is not executing a real-time task, determining that the target processor core is associated with an idle time greater than idle times of other processor cores from the plurality of target processor cores, or any combinations thereof.

10. A system for executing a plurality of tasks in a computer operating environment, the system comprising:
   one or more processors;
   memory storing processor-executable instructions, which, when executed by the one or more processors, cause the one or more processors to,
   monitor a remaining execution time of a current task executing in a first processor of the one or more processors; and
   perform pre-emption of the current task based on the remaining execution time of the current task and a desired execution threshold time, the desired execution threshold time being one of a desired value based on one or more configuration parameter of the current task or a dynamic value determined based on information related to ongoing activities in the computer operating environment-, wherein the performing the pre-emption further includes,
   comparing the remaining execution time of the current task executing on the first processor with a desired execution value, the desired execution value determined based on the desired execution threshold time and an interrupt processing time associated with the first processor,
   pre-empting the current task in response to the remaining execution time being greater than or equal to the desired execution value, and
   cancelling the pre-emption of the current task in response to the remaining execution time being less than the desired execution value.

11. The system as claimed in claim 10, wherein the computer operating environment is one of:
   a single processor environment or a multi-processor core-environment.

12. The system of claim 10, wherein the one or more processors are further caused to:
   determine the desired execution threshold time based on a total expected execution time of the current task, the total expected execution time determined based on one or more configuration parameters of the current task and the information related to the ongoing activities in the computer operating environment.

13. The system as claimed in claim 10, wherein the information related to the ongoing activities in the computer operating environment comprises at least one of:
   one or more current activities in the one or more processors, a load observed on the one or more processors, a frequency of execution of tasks in the one or more processors, or any combinations thereof.

14. The system as claimed in claim 10, wherein the current task is one of:
   a bounded task, or a free-running task in a multi-processor environment.

15. The system as claimed in claim 14, wherein in response to the current task being the bounded task, the one or more processors are further caused to:
   select a bounded processor cere as the first processor for executing the current task based on one or more bounded core conditions associated with the bounded processor; and
   compare the remaining execution time of the current task executing on the bounded processor with the desired execution value, the desired execution value determined based on the desired execution threshold time and the interrupt processing time associated with the bounded processor.

16. The system as claimed in claim 15, wherein the one or more bounded core conditions comprises at least one of:
   identifying that the bounded processor is not a local processor, determining that the bounded processor is active, determining that the bounded processor is running a lower priority task, determining that the bounded processor is not executing a real-time task, or any combinations thereof.

17. The system as claimed in claim 14, wherein in response to the current task being the free-running task, the one or more processors is further caused to:
   select a target processor as the first processor for executing the current task from a plurality of target processors based on one or more target core conditions associated with the plurality of target processors; and compare the remaining execution time of the current task executing on the target processor with the desired execution value, the desired execution value set based on the desired execution threshold time and the interrupt processing time associated with the target processor.

18. The system as claimed in claim 17, wherein the one or more target core conditions comprises at least one of:

identifying that the target processor is not a local processor-core, determining that the target processor is active, determining that the target processor is running a lower priority task, determining that the target processor is not executing a real-time task, determining that the target processor is associated with an idle time greater than idle times of other processors from the plurality of target processors-ceres, or any combinations thereof.

19. A non-transitory computer readable medium storing computer readable instructions, which when executed by processing circuitry, causes the processing circuitry to:

monitor a remaining execution time of a current task executing in a first processor core of a computer operating environment; and perform pre-emption of the current task based on the remaining execution time of the current task and a desired execution threshold time, the desired execution threshold time being one of a desired value based on one or more configuration parameter of the current task or a dynamic value determined based on information related to ongoing activities in the computer operating environment, wherein the performing the pre-emption further includes, comparing the remaining execution time of the current task executing on the first processor core with a desired execution value, the desired execution value determined based on the desired execution threshold time and an interrupt processing time associated with the first processor core, pre-empting the current task in response to the remaining execution time being greater than or equal to the desired execution value, and cancelling the pre-emption of the current task in response to the remaining execution time being less than the desired execution value.

20. The non-transitory computer readable medium of claim 19, wherein the computer operating environment is one of:

a single processor core environment or a multi-processor core environment.

* * * * *